Nov. 8, 1955 W. F. SIMPSON ET AL 2,723,163
WAGON ELEVATOR FOR COTTON STRIPPER
Filed Aug. 20, 1954 2 Sheets-Sheet 2
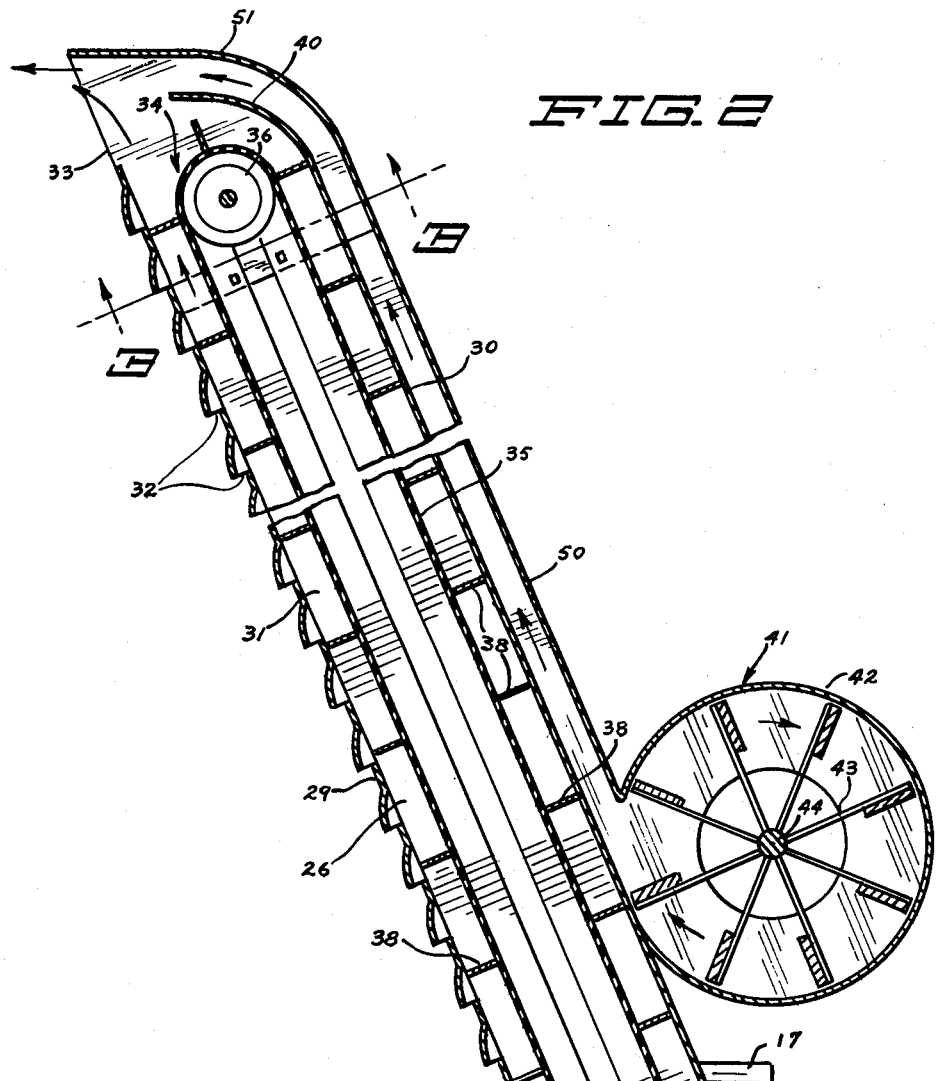
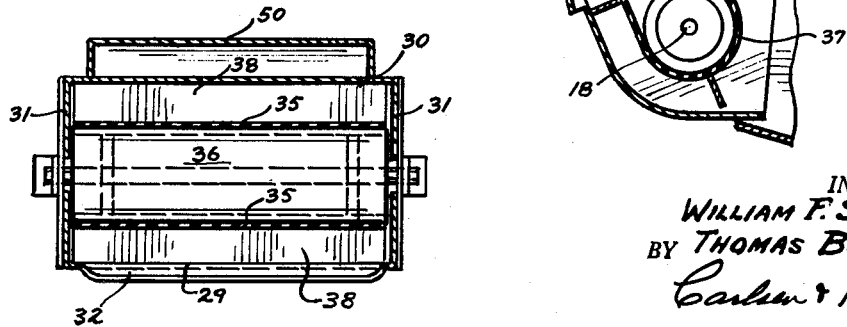
INVENTOR.
WILLIAM F. SIMPSON
BY THOMAS BLACKMAN
ATTORNEYS

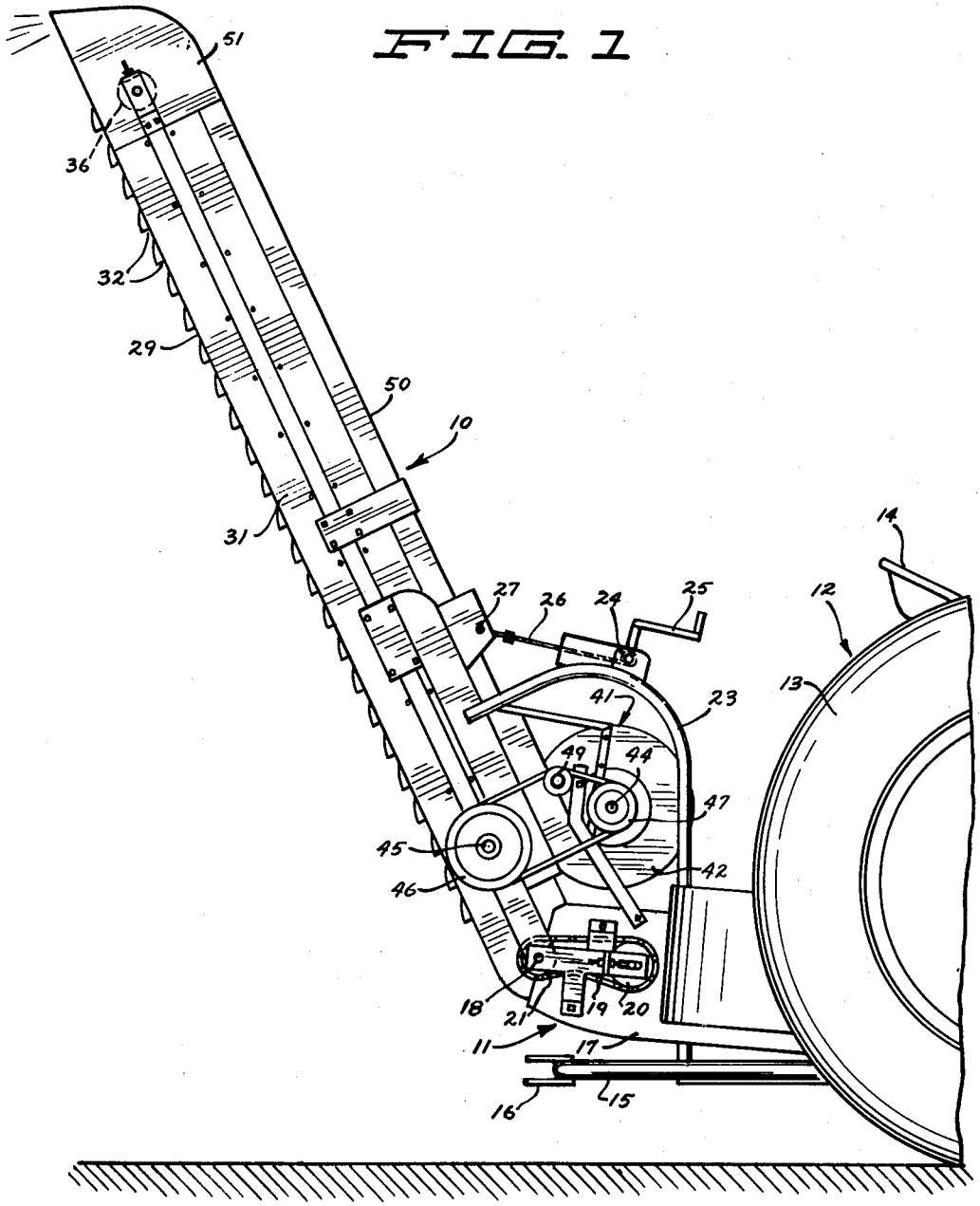

United States Patent Office 2,723,163
Patented Nov. 8, 1955

2,723,163

WAGON ELEVATOR FOR COTTON STRIPPER

William F. Simpson and Thomas Blackman, Louisville, Ky., assignors to Minneapolis-Moline Company, Hopkins, Minn., a corporation of Minnesota Application August 20, 1954, Serial No. 451,136

6 Claims. (Cl. 302—19)

This invention relates generally to cotton harvesters or strippers and more particularly to elevator means for carrying the picked or harvested cotton from the stripper to the transport wagon.

In cotton harvesting, where the harvester is of the type such as to be mounted upon a tractor, a transport wagon is normally hitched to the tractor to follow behind the harvester to receive the cotton as it is picked. Such harvesters, which are generally referred to as "cotton strippers," are conventionally provided with a rearwardly and upwardly inclined elevator for delivering the cotton into the wagon box. The elevator may be provided with a blower fan which provides a blast of air at the discharge opening at the upper end of the elevator whereby the cotton may be guided as it leaves the elevator for uniform loading of the wagon. The air blast also serves to somewhat separate the cotton bolls as they are deposited in the wagon inasmuch as the greener, heavier bolls are not affected by the blast to the same extent as are the white or lighter bolls. In brief, as the crop is moved to the discharge end of the elevator and into the blast of the blower fan, the pure cotton will be blown to the rear of the wagon, while the green bolls fall in the front portion thereof. It is with improvements in the elevator blower and its mounted position on the elevator that the present invention is primarily concerned.

The primary object of the invention is to provide a new and improved blower equipped elevator for cotton strippers wherein the blower unit is disposed to deliver an air blast in a rearward direction through the discharge opening of the elevator.

Another object of the invention is to provide an elevator for a cotton stripper with a blower fan to provide a blast of air for separating the green and pure cotton bolls as they are discharged from the elevator, said blower fan so mounted as to blow through the cotton crop as it is conveyed upwardly for discharge so as to primarily affect the pure cotton.

Still another object of the present invention is to provide a wagon elevator for a cotton stripper with a blower fan which is in an out-of-the-way position so as to allow the stripper greater clearance at its rear side.

Still another object of the invention is to provide a blower fan and duct for delivering a blast of air to the upper discharge end of a wagon elevator on a cotton stripper wherein said duct is in such a position as to leave the bottom perforate wall of the elevator unencumbered for discharge of dirt and trash from the crop through the wall and to the ground.

With these objectives in mind our invention broadly comprises an elongated elevator housing mounted at the rear end of a cotton stripper and swingable about a horizontal axis between various upwardly and rearwardly inclined positions, said housing having a perforate upwardly and rearwardly inclined rear wall, a discharge spout or opening at the upper end of the housing, an undershot conveyor in the housing for carrying cotton upwardly along said rear wall to the discharge spout, an air passage extending upwardly and rearwardly along the housing over the conveyor and having open communication with the discharge spout, and a blower mounted on the housing at the lower forward end of the air passageway for blowing air through the passageway.

The above mentioned and still additional objects of the invention will be brought to light during the course of the following specification, reference being made to the accompanying drawings, in which—

Fig. 1 is a side elevation showing our improved elevator at the rear end of a cotton stripper mounted on a tractor.

Fig. 2 is a longitudinal vertical section taken through the elevator and blower housings.

Fig. 3 is a transverse section taken on line 3—3 of Fig. 2.

Referring now more particularly to the drawings, reference numerals will be used to denote like parts and structural features in the different views. In Fig. 1 an elevator constructed in accordance with the present invention is designated generally by the number 10 and is shown extending upwardly and rearwardly from the rear end of a cotton stripper 11 mounted on a tractor 12 of which only the rear traction wheels 13, operator's seat 14, and draw bar 15 are shown. The forward end 16 of a transport wagon tongue is hitched to the bar 15 so that the wagon will be pulled behind the elevator 10 as the tractor-stripper combination is moved through the field.

The stripper 11 has a housing 17 which extends rearwardly from between the tractor wheels 13 and encloses a conveyor (not shown) adapted to deliver the stripped cotton rearwardly from the stripper units to the elevator 10. The elevator 10 is pivotally associated with the housing 17 for swinging movement about the axis of a transverse shaft 18. A chain drive mechanism is mounted at the side of housing 17 with the chain 19 trained over fore and aft sprockets 20 and 21, the sprocket 21 keyed to the shaft 18. This mechanism is to drive the elevator conveyor from the conveyor disposed within housing 17, said latter conveyor being driven through suitable gear and chain connections (not shown) from the power take-off of the tractor 12.

A bracket 23 mounted on the platform of the tractor 12 supports a windlass mechanism 24 operated by a crank 25 and upon which is wound a cable 26 having its distal end connected to the center of a cross rod 27 mounted on the elevator 10. By operating the crank 25 to selectively wind the cable 26 upon or unwind it from the windlass 24, the elevator may be moved about the axis 18 to the desired angle of incline.

Referring now more particularly to Figs. 2 and 3, the elevator 10 will be described in detail. The elevator has a rear or bottom wall 29, a front or top wall 30, and connecting side walls 31 which form an elongated conveyor housing which is rectangular in cross section (Fig. 3). The rear wall 29 is provided with a plurality of openings or louvers 32 for allowing dirt and trash falling from the cotton crop to leave the elevator and said wall 29 terminates short of the upper ends of the walls 31 leaving a rearwardly opening discharge spout or opening 33 at the upper end of the elevator.

Disposed within the elevator housing and extending longitudinally thereof there is provided a belt conveyor 34 comprising a continuous belt 35 extending around drums 36 and 37 mounted respectively at the upper and lower ends of the housing and journaled in bearing brackets mounted on the side walls 31 thereof for rotation on parallel transverse axes. The belt 35 carries flights 38 adapted to extend the distance from the belt to the adjacent front or rear wall of the elevator and contact the wall edgewise.

Sprocket 21 is fixed to the same shaft 18 as drum 37 and as the sprocket 21 is driven from the sprocket 20 through chain 19 the conveyor belt 35 is driven about the rollers 36 and 37 in the direction indicated by the arrows. So operated the elevator conveyor is of the undershot type with the flights 38 carrying the harvested cotton bolls fed into the bottom of the elevator, upwardly along the inclined rear wall 29 to the discharge opening 33. The upper end of the front wall 30 curves rearwardly over the upper end conveyor as at 40.

A blower is mounted on the lower forward portion of the elevator and against the front wall 30. This blower is indicated generally by the number 41 and comprises a cylindrical housing 42 enclosing a rotary paddle fan 43 adapted for rotation in the direction indicated about the axis of a transverse center shaft 44. Fan 43 is driven off the shaft 18 which carries a pulley wheel (not shown) on its end extending to the left side of the elevator. That pulley is in turn connected by a suitable belt drive, also at the left side of the elevator, to the shaft 45 which carries the large pulley 46. A pulley 47 keyed to shaft 44 is driven from sheave 46 through belt 48 as shown in Fig. 1, the sheave 47 being considerably smaller in diameter than sheave 46 and the others for rotation of the fan at a faster speed than the conveyor drums. The number 49 indicates a tightening pulley which may be moved to loosen the belt 48 should it be desired to leave the fan 43 idle during operation of the elevator.

An air duct 50 is in open communication with the fan housing 42 and extends upwardly along the front wall 30 curving therewith at its upper end, as at 51, and extending rearwardly to the plane of the wall 29. Thus the duct 50 channels the blast of air created by fan 43 upwardly to blow in a horizontally rearward direction out the discharge opening 33 at the upper end of the elevator.

In operation as the tractor 12 which carries cotton stripping units is driven through the field, the stripped cotton bolls are delivered by suitable conveyor mechanism to the housing 17. The short fore and aft running conveyor in the housing 17 moves the harvested cotton into the lower end of the elevator 10 where it is engaged by the flights 38 and moved upwardly along the wall 29 to the discharge opening 33. As the bolls are moved along the wall 29 any loose dirt or trash is allowed to fall to the ground through the louver openings 32.

As the cotton bolls reach the upper edge of wall 29 they would normally fall through the opening 33 and into the front end of the box of the transport wagon. However, it is desirable that some of the cotton also be deposited in the rearward portions of the wagon for uniform distribution and this, of course, is the purpose of providing the air blast at the place of discharge. As the crop is moved into the opening the lighter purer bolls will be caught by the blast and blown to the rear of the wagon while the heavier green bolls will descend relatively unaffected by the blast. A conventional directional bonnet or distributing spout may be attached to the conveyor at the opening 33 to direct the stream of cotton under influence of the air blast to different parts of the wagon. Thus the blower serves the double purpose of distributing and separating the cotton bolls as they are discharged into the transport wagon.

While the use of blower fans on cotton elevators of this type is not a new concept, the particular arrangement here shown is believed to be novel. In heretofore known devices the blower has been placed against the rear wall of the elevator with the blast duct extending upwardly therealong. The advantages of the present arrangement over such a construction are many. First, the present design allows the use of an open perforate rear elevator wall 29 for more effective cleaning during the elevating operation. Second, in the present construction the blower 41 is in an out-of-the-way position allowing greater clearance at the rear of the elevator and removing the hazard of blower damage through backing into obstructions and the like. Third, in the present construction there is no chance for the bolls to fall down the blast duct and into the fan mechanism as frequently occurs with the rear mounted blower, particularly when the blower is idle. Fourth, with the overshot air blast as in the present construction the green cotton may never go through the blast but will fall directly into the front of the wagon in the desired manner. And last, with the present design it is possible to direct the blast horizontally through the discharge opening with unmuffled force allowing the crop to be blown a greater distance.

Accordingly, the present invention economically and effectively carries out the aforementioned objectives. It is understod that suitable modifications may be made in the structure as disclosed, provided such modifications come within the spirit and scope of the appended claims. Having now therefore fully illustrated and described our invention, what we claim to be new and desire to protect by Letters Patent is:

1. In a cotton harvester, a wagon elevator comprising an elongated conveyor housing extending upwardly and outwardly from the harvester and having inclined inner and outer walls in spaced parallel relation, said housing having a discharge opening at the upper end of said outer wall, a conveyor in the housing for carrying cotton upwardly in a stream along said outer wall to the discharge opening, a blower fan for creating an air blast mounted on said inner wall, and an air duct having open communication with the blower fan and extending outwardly to the discharge opening for delivering the fan air blast through the opening, the extended end of the duct being so positioned relative to the opening as to direct the blast primarily through the upper area of the opening.

2. In a cotton harvester, a wagon elevator comprising an elongated conveyor housing extending upwardly and outwardly from the harvester and having inclined inner and outer walls in spaced parallel relation, said housing having a discharge opening at the upper end of said outer wall, a conveyor in the housing for carrying cotton upwardly in a stream along said outer wall to the discharge opening, a blower fan for creating an air blast mounted on said inner wall, and an air duct having open communication with the blower fan and extending outwardly to the discharge opening for delivering the fan air blast across the crop stream as it reaches said opening, said duct extending upwardly along said inner wall and then curving outwardly and terminating with an open end at the elevation of said discharge opening.

3. In a cotton stripper, a wagon elevator comprising an elongated housing having an outer wall extending upwardly and outwardly from the stripper and an inner wall spaced inwardly from and parallel to the outer wall, said housing having a discharge opening at the upper end of the outer wall, an undershot conveyor disposed within the housing between said walls and having flights operative to move cotton delivered to the lower end of the housing upwardly along the outer wall to the discharge opening, said outer wall having a series of louver openings spaced along its length, a blower mounted on the inner wall of the housing and adapted to create a blast of air, an air duct having open communication with the blower and extending upwardly along the inner wall and then curving outwardly at the elevation of said discharge opening and terminating between the inner and outer walls for delivering the fan air blast in a generally horizontal outward direction through said opening.

4. In a cotton stripper adapted to be mounted on a tractor having a transport wagon hitched in draft relation thereto to follow behind the tractor as it moves through a field, an elevator for carrying harvested cotton bolls from the stripper to the wagon, said elevator comprising a housing having spaced front and rear walls inclined upwardly and rearwardly from the stripper, said housing having a discharge opening at the upper end of the rear wall, a belt conveyor extending longitudinally of the housing between the front and rear walls and having flights projecting from the belt for edgewise engagement with the walls, the inner wall of the housing having its upper end portion curving rearwardly over the upper end of the conveyor and terminating opposite said discharge opening, means for driving the conveyor so that the flights move upwardly along the rear wall to carry cotton bolls deposited in the lower end of the housing upwardly to the discharge opening, a blower fan mounted on the elevator forward of the housing, an air duct having open communication with the blower fan and extending upwardly along the front side of the front wall along its entire length and having its extended end open for directing an air blast from the blower through said discharge opening, the open end of said duct being slightly higher in elevation than the bottom edge of said opening.

5. In a cotton harvester, a wagon elevator comprising an elongated conveyor housing extending upwardly and outwardly from the harvester and having inclined inner and outer walls in spaced relation, said housing having a discharge opening at the upper end of said outer wall, the upper edge of said opening lying as far outward as the other edges, a conveyor in the housing for carrying cotton upwardly in a stream along said outer wall to the discharge opening, a blower fan for creating an air blast mounted on the housing, an air duct connected to the fan and extending toward the discharge opening with its extended end open for directing the fan air blast through said opening, the extended end portion of the duct extending horizontally at such an elevation as to direct the air blast horizontally outward through the opening across said upper edge of the opening.

6. In a cotton stripper, a wagon elevator comprising an elongated housing having an outer wall extending upwardly and outwardly from the stripper and an inner wall spaced inwardly from and parallel to the outer wall, said housing having a discharge opening at the upper end of the outer wall, an undershot conveyor disposed within the housing between said walls and having flights operative to move cotton delivered to the lower end of the housing upwardly along the outer wall to the discharge opening, a blower mounted on the inner wall of the housing and adapted to create a blast of air, an air duct having open communication with the blower and extending upwardly along the inner wall and then curving outwardly at the elevation of said discharge opening and terminating between the inner and outer walls for delivering the fan air blast in a generally horizontal outward direction through said opening.

References Cited in the file of this patent

UNITED STATES PATENTS

| | | |
|---|---|---|
| 517,530 | Reeves | Apr. 3, 1894 |
| 1,737,561 | Bernert | Dec. 3, 1929 |
| 2,288,238 | Goodall | June 30, 1942 |

FOREIGN PATENTS

| | | |
|---|---|---|
| 495,709 | Germany | Nov. 30, 1927 |